United States Patent
Romanov et al.

(10) Patent No.: US 8,695,435 B2
(45) Date of Patent: Apr. 15, 2014

(54) METHOD OF MEASURING A VOLUME FLOW RATE OF A CONTROLLED MEDIUM IN A PIPELINE

(75) Inventors: Yuriy Igorevich Romanov, Novosibirsk (RU); Dmitry Yurievich Svilpov, Novosibirsk (RU); Stanislav Vladimirovich Maletskiy, Novosibirsk (RU); Olga Vladimirovna Chagina, Berdsk (RU)

(73) Assignee: Closed Corporation Coherent, Novosibirsk (RU)

( * ) Notice: Subject to any disclaimer, the term of this patent is extended or adjusted under 35 U.S.C. 154(b) by 447 days.

(21) Appl. No.: 13/212,614

(22) Filed: Aug. 18, 2011

(65) Prior Publication Data

US 2011/0301878 A1 Dec. 8, 2011

Related U.S. Application Data

(63) Continuation-in-part of application No. 12/990,871, filed as application No. PCT/RU2008/000429 on Jul. 2, 2008, now Pat. No. 8,020,452.

(30) Foreign Application Priority Data

May 12, 2008 (RU) ................ 2008118645

(51) Int. Cl.
*G01F 1/66* (2006.01)

(52) U.S. Cl.
USPC ........................................ 73/861.27

(58) Field of Classification Search
USPC ................ 73/861.28, 861.27; 324/640
See application file for complete search history.

(56) References Cited

U.S. PATENT DOCUMENTS 4,787,252 A * 11/1988 Jacobson et al. ............ 73/861.28
5,178,018 A    1/1993 Gill
6,606,916 B2 * 8/2003 Bignell et al. ............ 73/861.27
6,696,843 B1 * 2/2004 Beneteau et al. ............ 324/640

FOREIGN PATENT DOCUMENTS

RU    2160887 C1    12/2000
SU    918790 A1    4/1982

OTHER PUBLICATIONS

International Search Report from PCT/RU 2008/000429 dated Jan. 22, 2009 (1 page).
English abstract of RU-2160887 (1 page).
English translation regarding claim of SU918790.

* cited by examiner

*Primary Examiner* — Jewel V Thompson
(74) *Attorney, Agent, or Firm* — Rader, Fishman & Grauer PLLC; Alexander D. Rabinovich

(57) ABSTRACT

Method comprises transmitting and receiving ultrasound signals (USS) in and counter direction of flow (ICDF) of controlled medium in pipeline (CMP); determining times of USS transmission ICDF of CMP and difference therebetween; forming time difference code; forming array of address codes corresponding to zero crossing moments of codes of USS passed ICF of CMP; determining zero crossing moment address code for codes of USS passed ICF of CMP closest to mutual correlation function (MCF) maximum address codes; selecting codes of USS passed ICDF of CMP corresponding to MCF maximum; forming MCF of selected part of codes of USS passed ICDF of CMP and signal shifted by 90° to primary USS; digitizing these MCF forming codes of time transmission of USS passed ICDF of CMP within sampling rate interval; determining accurate difference code of time intervals between USS passed ICDF of CMP; and determining CMP volume flow rate from a formula.

3 Claims, 6 Drawing Sheets

US 8,695,435 B2

METHOD OF MEASURING A VOLUME FLOW RATE OF A CONTROLLED MEDIUM IN A PIPELINE

CROSS-REFERENCE TO RELATED APPLICATIONS

This application is a continuation-in-part of the U.S. application Ser. No. 12/990,871 filed Nov. 3, 2010 now U.S. Pat. No. 8,020,452, which is a U.S. National phase application of the International application WO 2009/139661 A1 (PCT/RU2008/000429), filed Jul. 2, 2008, and claiming priority to Russian application 2008118645, filed May 12, 2008, the entire contents of each application being hereby incorporated into the present application by reference in full.

BACKGROUND OF THE INVENTION

1. Field of the Invention

The proposed technical solution relates to a field of measuring means and devices and can be used for more accurate measuring of the volume flow rate of a controlled medium in a pipeline (CMP).

2. Description of Related Art

Similar technical solutions are known, e.g. see Russian Federation patent No. 2160887, IPC: G01F 1/66. A method disclosed in the prior art publication comprises the steps of: providing ultrasound signals (USS), alternately radiating USS into synchronized rings formed by a receiving-amplifying channel with a lagged feedback through an electro-acoustic channel, receiving the signals passing along and counter the flow in a pipeline, measuring the time of propagation along and counter the flow, subtracting the first from the second, and calculating a flow rate according to a formula.

The proposed technical solution and the above-described similar prior art technical solution are characterized by the following common features: providing USS, alternately radiating USS, receiving the signals passing along and counter the flow in a pipeline, measuring the time of propagation along and counter the flow, and calculating a flow rate according to a formula.

A different prior art technical solution (see USSR Inventor's Certificate No. 918790) is believed to be the closest analog to the claimed solution. The method disclosed in this prior art comprises the steps of: forming USS, transmitting the USS in and counter the direction of a flow of a controlled media in a pipeline (CMP), receiving the USS that passed in and counter the direction of the flow of the CMP, discriminating a sequence of pulses corresponding to the difference of time delay, demodulating the sequence by a low pass filter, additionally modulating and again demodulating in a low pass filter, obtaining a signal proportional to the volume flow rate of the CMP.

The claimed technical solution and the above-described similar technical solution believed to be the closest analog to the claimed one are characterized by the following common steps: forming USS, transmitting the USS in and counter the direction of a flow of the CMP, receiving the USS that passed in and counter the direction of the flow of the CMP, discriminating a sequence of pulses corresponding to the difference of time delay.

The technical result that cannot be achieved with any of the above-described prior art technical solutions consists of decreasing the error degree in calculating the difference in time of USS transmission in and counter the direction of the flow of the CMP.

The reason for impossibility of achieving the above-described technical result lies in the fact that the traditional method used when determining the difference between the measured time values of USS transmission in and counter the direction of the flow of the CMP is mostly based on comparing these measured values and obtaining the difference thereof and does not provide for measuring this difference fairly enough, which eventually does not allow the accurate computation of the volume flow rate of the CMP, whereas no proper efforts were made at finding alternative solutions.

With the characteristics and analysis of the prior art solutions in view, it can be concluded that the objective of developing equipment for measuring the volume flow rate of the CMP, which ensures greater accuracy, remains topical.

BRIEF SUMMARY OF THE INVENTION

The above-specified technical result can be achieved by providing a succession of the following steps in a method of the invention: (a) forming a sequence of primary USS; (b) alternately transmitting the USS in and counter the direction of a flow of the CMP; (c) alternately receiving the USS that passed in and counter the direction of the flow of the CMP; (d) forming a mutual correlation function of the codes of the USS passed in the direction of the flow of the CMP and the codes of the primary USS, to thereby determine the time of USS transmission in the direction of the flow of the CMP; (e) forming a mutual correlation function of the codes of the USS passed counter the direction of the flow of the CMP and the codes of the primary USS, to thereby determine the time of USS transmission counter the direction of the flow of the CMP; (f) forming a mutual correlation function of the codes of the USS passed in and counter the direction of the flow of the CMP, to thereby determine the difference between the time of USS transmission in and counter the direction of the flow of the CMP; (g) forming a code of the position address for the maximum value of the mutual correlation function of the codes of the USS passed in and counter the direction of the flow of the CMP, to thereby form a code of the time difference of the USS transmission in and counter the direction of the flow of the CMP; (h) forming an array of address codes corresponding to moments of zero crossing of the codes of the USS passed in the direction of the flow of the CMP; (i) determining the code of zero crossing moment address for the codes of the USS passed in the direction of the flow of the CMP, which the closest to the code of the position address for the maximum value of the mutual correlation function; (j) selecting a part of codes of the USS passed in the direction of the flow of the CMP, which corresponds to the maximum value of the correlation function; (k) forming a mutual correlation function of the selected part of the codes of the USS passed in the direction of the flow of the CMP and a delayed signal phase shifted by 90° in relation to codes of the primary USS; (l) re-digitizing this mutual correlation function at $mf_1$, where "m">>1, and forming a code of the time transmission of the USS passed in the direction of the flow of the CMP within one interval of the sampling rate "$f_1$"; (m) selecting a part of codes of the USS passed counter the direction of the flow of the CMP, which corresponds to the maximum value of the correlation function; (n) forming a mutual correlation function of the selected part of the codes of the USS passed counter the direction of the flow of the CMP and a delayed signal phase shifted by 90° in relation to codes of the primary USS; (o) re-digitizing this mutual correlation function at $mf_1$, where "m">>1, and forming a code of the time transmission of the USS passed in the direction of the flow of the CMP within one interval of the sampling rate "$f_1$"; (p) determining a code of the accurate difference of time intervals between the USS passed in and counter the direction of the flow of the CMP; and (q) determining the volume flow rate of the CMP from the formula $$Q = \frac{\Delta T}{(T_1 - \tau)(T_2 - \tau)} \cdot k,$$

where:

$\Delta T$—the code of accurate difference of time of USS transmission in and counter the direction of the flow of the CMP; $T_1$—the code of time of USS transmission in the direction of the flow of the CMP; $T_2$—the code of time of USS transmission counter the direction of the flow of the CMP; $\tau$—the constant value that depends on the dimension geometry and materials of the transmitting-receiving radiators of USS; and $\kappa$—a proportionality factor depending on the geometric dimensions inside the pipeline.

The primary USS are formed in a digital form, and then transformed into analog signals to be transmitted into the pipeline. They are digitized back at a sampling rate $f_1$ after being received from the pipeline.

Conducting analysis of prior art technical solutions has shown that none of them contains the whole succession of the above steps, which led to the conclusion that the proposed technical solution satisfies such criteria of patentability as "novelty" and "inventive level".

BRIEF DESCRIPTION OF THE DRAWINGS

The above features and advantages of the present invention will now be discussed in more detail with the use of the drawings, in which.

DETAILED DESCRIPTION OF THE INVENTION

Figure 1A:
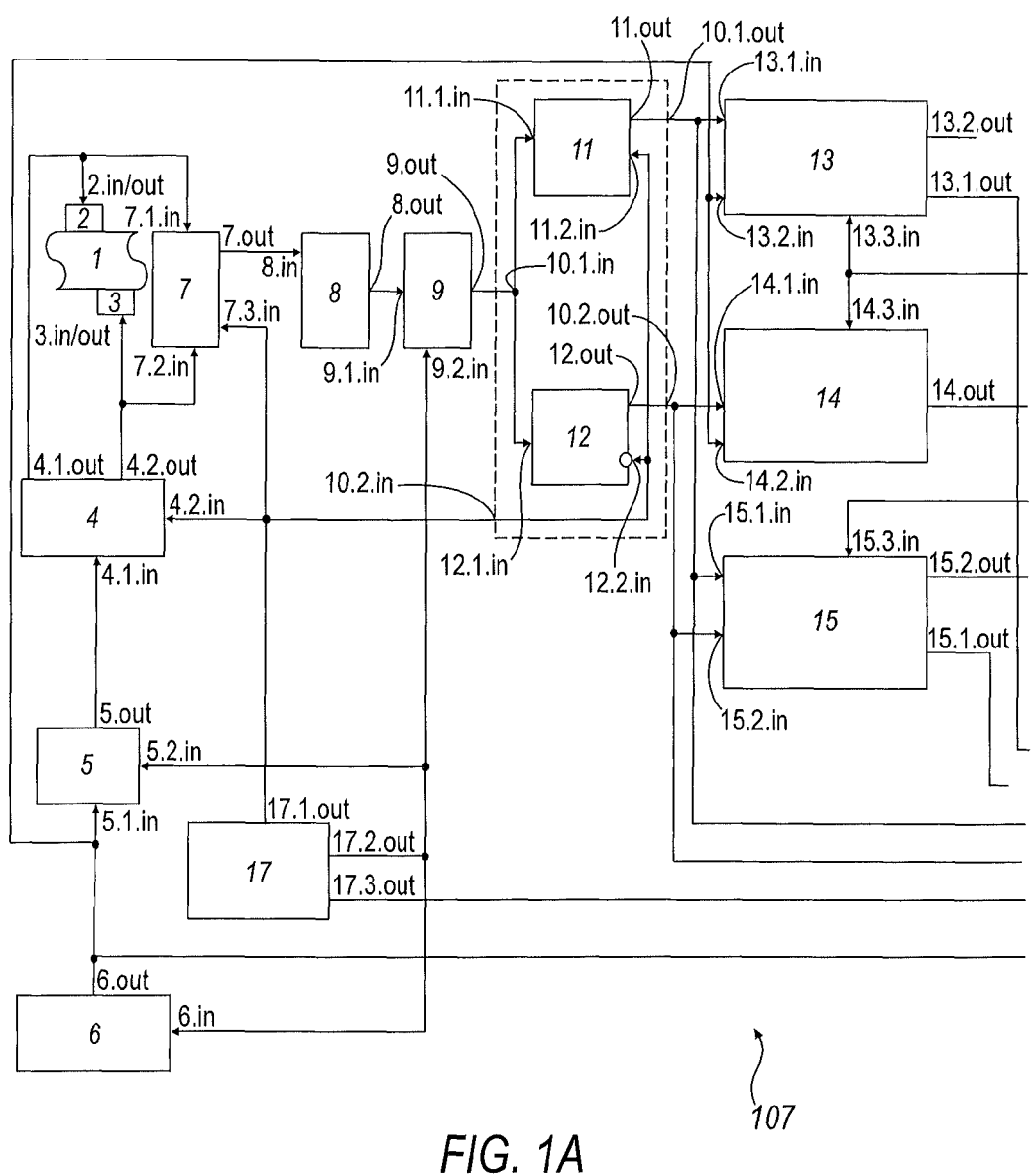
FIGS. 1a and 1b to be considered together show a functional diagram of a device for measuring the volume flow rate of the CMP, in which a method according to present invention can be implemented.
Figure 1B:
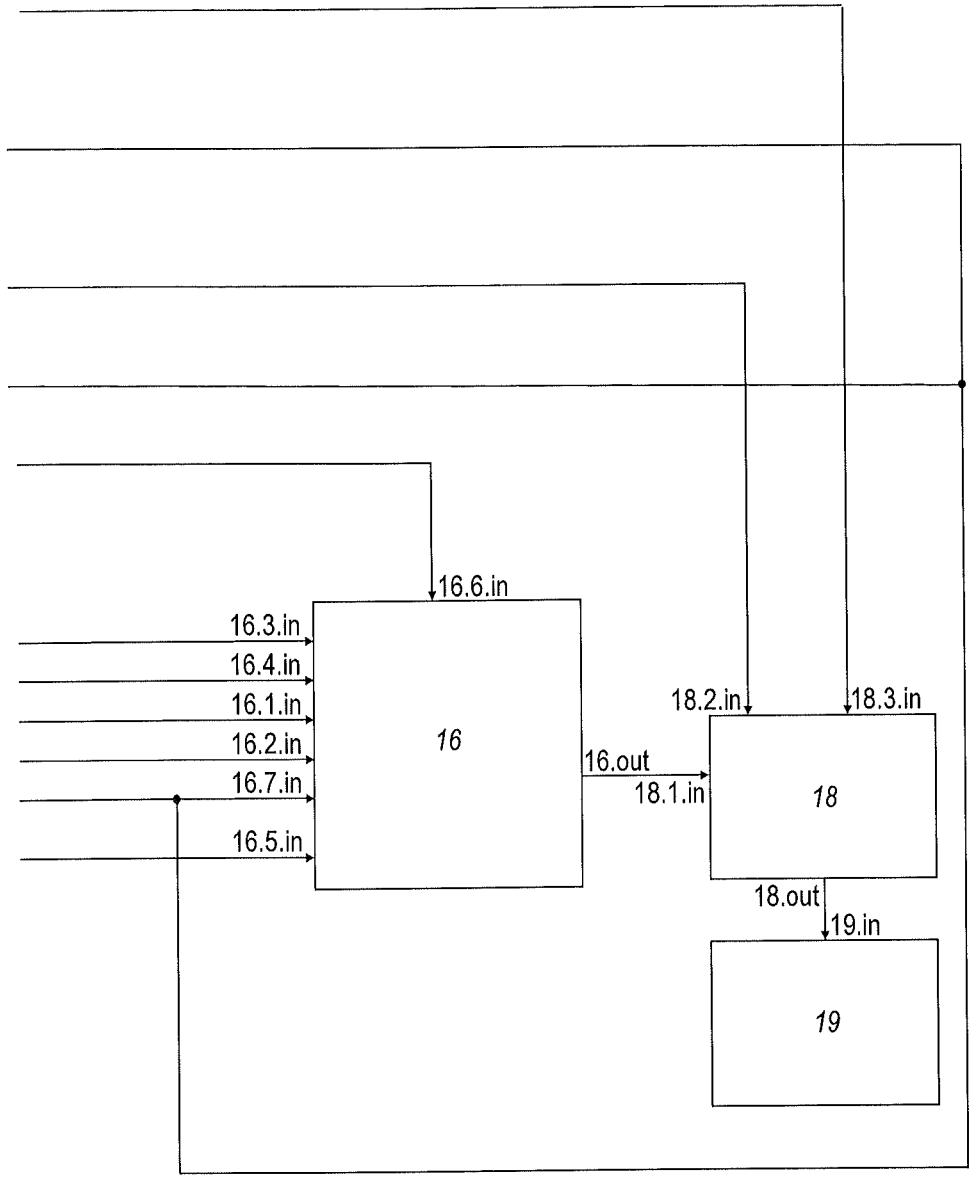

A device 107 for measuring the volume flow rate of the CMP (see FIGS. 1a and 1b), in which device the method of the present invention can be implemented, contains:

a pipeline 1 with the controlled medium;

a first transmitting-receiving radiator 2 of ultrasonic signals installed on the pipeline 1 with the controlled medium;

a second transmitting-receiving radiator 3 of ultrasonic signals installed on the pipeline 1 with the controlled medium and shifted in the direction of the controlled medium flow in the pipeline in relation to the first transmitting-receiving radiator 2 of ultrasonic signals;

a first multiplexer 4 whose first out-port 4.1.out is connected to a in-port/out-port pin 2.1 of the first transmitting-receiving radiator 2 of ultrasonic signals, and whose second out-port 4.2.out is connected is to a in-port/out-port pin 3.1 of the second transmitting-receiving radiator 3 of ultrasonic signals;

a digital-to-analog converter 5 whose out-port 5.out is connected to a first in-port 4.1.in of the first multiplexer 4;

an ultrasonic signal source 6 whose out-port 6.out is connected to a first in-port 5.1.in of the digital-to-analog converter 5;

a second multiplexer 7, whose second in-port 7.2.in is connected to the pin 3.1 of the second transmitting-receiving radiator 3 of ultrasonic signals, and whose first in-port 7.1.in is connected to the pin 2.1 of the first transmitting-receiving radiator 2 of ultrasonic signals;

an ultrasonic signal amplifier 8 with automatic amplification adjustment, whose in-port 8.in is connected to an out-port 7.out of the second multiplexer 7;

an analog-to-digital converter 9, whose first in-port 9.1.in is connected to an out-port 8.out of the ultrasonic signal amplifier 8 with automatic gain control;

a memory unit 10 constructed as a first RAM 11, whose first in-port 11.1.in, as a first in-port 10.1.in of the memory unit 10, is connected to an out-port 9.out of the analog-to-digital converter 9, and a second RAM 12, whose first in-port 12.1.in, as the first in-port 10.1.in of the memory unit 10 is also connected to the out-port 9.out of the analog-to-digital converter 9;

a unit 13 for computing the time of ultrasonic signal transmission in the direction of the flow of the CMP 1, whose first in-port 13.1.in is connected to a first out-port 10.1.out of the memory unit 10 (to an out-port 11.out of the first RAM 11), and whose second in-port 13.2.in is connected to the out-port 6.out of the ultrasonic signal source 6;

a unit 14 for computing the time of ultrasonic signal transmission counter the direction of the flow of the CMP 1, whose first in-port 14.1.in is connected to a second out-port 10.2.out of the memory unit 10 (to an out-port 12.out of the second RAM 12), and whose second in-port 14.2.in is connected to the out-port 6.out of the ultrasonic signal source 6;

a unit 15 for computing the time difference between the ultrasonic signal transmission in and counter the direction of the flow of the CMP 1, whose first in-port 15.1.in is connected to the first out-port 10.1.out of the memory unit 10 (to the out-port 11.1.out of the first RAM 11), and whose second in-port 15.2.in is connected to the second out-port 10.2.out of the memory unit 10 (to the out-port 12.out of the second RAM 12);

an additional unit 16 for computing the time difference between the ultrasonic signal transmission in and counter the direction of the flow of the CMP 1, whose first in-port 16.1.in is connected to the first out-port 10.1.out of the memory unit 10 (to the out-port 11.out of the first RAM 11), whose second in-port 16.2.in is connected to the second out-port 10.2.out of the memory unit 10 (i.e. to the out-port 12.out of the second RAM 12), whose third in-port 16.3.in is connected to a first out-port 13.1.out of the unit 13 for computing the time of ultrasonic signal transmission in the direction of the flow of the CMP 1, whose fourth in-port 16.4.in is connected to a first out-port 15.1.out of the unit 15 for computing the time difference between the ultrasonic signal transmission in and counter the direction of the flow of the CMP 1, whose fifth in-port 16.5.in is connected to the out-port 6.out of the ultrasonic signal source 6, and whose sixth in-port 16.6.in is connected to a second out-port 15.2.out of the unit 15 for computing the time difference between the ultrasonic signal transmission in and counter the direction of the flow of the CMP 1;

control driver 17 whose first out-port 17.1.out is connected to a control (second) in-port 4.2.in of the first multiplexer 4, to a control (third) in-port 2.3.in of the second multiplexer 7, to the second direct (non-inverted) in-port 11.2.in of the first RAM 11 (second in-port 10.2.in of the memory unit 10) and to the second (inverted) in-port 12.2.in of the second RAM 12 (second in-port 10.2.in of the memory unit 10), whose second out-port 17.2.out is connected to an in-port 6.in of the ultrasonic signal source 6, to a second in-port 5.2.in of the digital-to-analog converter 5, and to a second in-port 9.2.in of the analog-to-digital converter 9, and whose third out-port 17.3.out is connected to a seventh in-port 16.7.in of the additional unit 16 for computing the time difference between the ultrasonic signal transmission in and counter the direction of the flow of the CMP 1, to a third in-port 13.3.in of the unit 13 for computing the time of ultrasonic signal transmission in the direction of the flow of the CMP 1, to a third in-port 14.3.in of the unit 14 for computing the time of ultrasonic signal transmission counter the direction of the flow of the CMP 1, and to a third in-port 15.3.in of the unit 15 for computing the time difference between the ultrasonic signal transmission in and counter the direction of the flow of the CMP 1;

a unit 18 for determining (computing) the volume flow rate of the CMP 1 whose first in-port 18.1.in is connected to an out-port 16.out of the additional unit 16 for computing the time difference between the ultrasonic signal transmission in and counter the direction of the flow of the CMP 1, whose second in-port 18.2.in is connected to an out-port 14.out of the unit 14 for computing the time of ultrasonic signal transmission counter the direction of the flow of the CMP 1, and whose third in-port 18.3.in is connected to a second out-port 13.2.out of the unit 13 for computing the time of ultrasonic signal transmission in the direction of the flow of the CMP 1;

a unit 19 for indicating the volume flow rate of the CMP 1 whose in-port 19.in is connected to an out-port 18.out of the unit 18 for determining (computing) the volume flow rate of the CMP 1.

Figure 2:
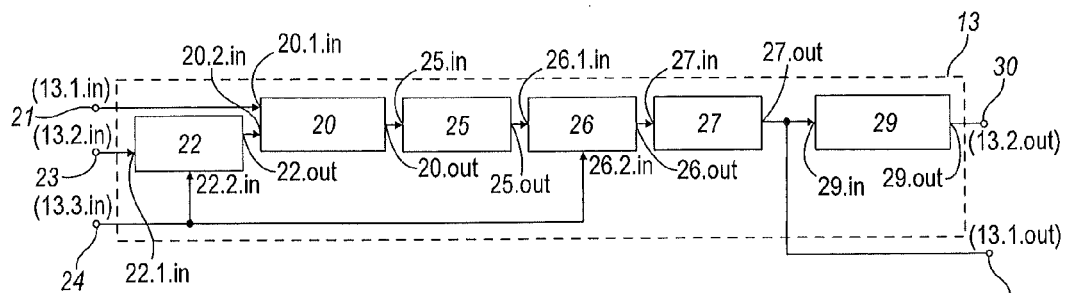
FIG. 2 shows a functional diagram of a unit for computing the time of ultrasonic signal transmission in the direction of the flow of the CMP of the device in FIGS. 1a-1b.
Figure 3:
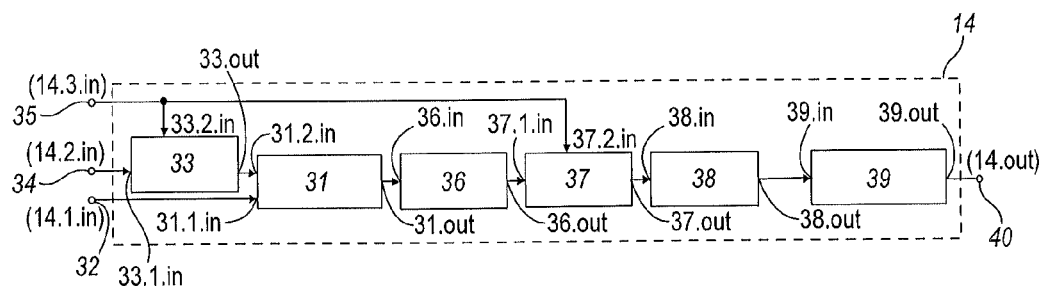
FIG. 3 shows a functional diagram of a unit for computing the time of ultrasonic signal transmission counter the direction of the flow of the CMP of the device in FIGS. 1a-1b.

The functional diagram of the unit 13 for computing the time of ultrasonic signal transmission in the direction of the flow of the controlled media in the pipeline shown in FIG. 2 contains:

a multiplier 20, whose first in-port 20.1.in (pin 21) is connected to the out-port 11.out of the first RAM 11 (to the first out-port 10.1.out of the memory unit 10);

a delay line 22, whose first in-port 22.1.in (pin 23) is connected to the out-port 6.out of the ultrasonic signal source 6, whose second in-port 22.2.in is connected (through the pin 24) to the third out-port 17.3.out of the control driver 17, and whose out-port 22.out is connected to a second in-port 20.2.in of the multiplier 20;

an adder 25 whose in-port 25.in is connected to an out-port 20.out of the multiplier 20;

a RAM 26, whose first in-port 26.1.in is connected to an out-port 25.out of the adder 25 and whose second in-port 26.2.in is connected (through pin 24) to the third out-port 17.3.out of the control driver 17;

a peak detector 27 whose in-port 27.in is connected to an out-port 26.out of the RAM 26, while an out-port 27.out of the peak detector 27 (pin 28) is also the first out-port 13.1.out of the unit 13 for computing the time of ultrasonic signal transmission in the direction of the flow of the controlled media in the pipeline 1;

a code-to-code converter 29 whose in-port 29.in is connected to the out-port 27.out of the peak detector 27 while an out-port 29.out of the code-to-code converter 29 (pin 30) is also the second out-port 13.2.out of the unit 13 for computing the time of ultrasonic signal transmission in the direction of the flow of the controlled media in the pipeline 1;

The functional diagram of the unit 14 for computing the time of ultrasonic signal transmission counter the direction of the flow of the controlled media in the pipeline 1 shown in FIG. 3 contains:

a multiplier 31 whose first in-port 31.1.in is connected (through pin 32) to the out-port 12.out of the second RAM 12 (to the second out-port 10.2.out of the memory unit 10);

a delay line 33, whose first in-port 33.1.in (pin 34) is connected to the out-port 6.out of the ultrasonic signal source 6, its second in-port 33.2.in is connected (through pin 35) to the third out-port 17.3.out of the control driver 17, and whose out-port 33.out is connected to the second in-port 31.2.in of the multiplier 31;

an adder 36, whose in-port 36.in is connected to an out-port 31.out of the multiplier 31;

a RAM 37, whose first in-port 37.1.in is connected to an out-port 36.out of the adder 36 and whose second in-port 37.2.in is connected (through pin 35) to the third out-port 17.3.out of the control driver 17;

a peak detector 38, whose in-port 38.in is connected to an out-port 37.out of the RAM 37;

a code-to-code converter 39, whose in-port 39.in is connected to an out-port 38.out of the peak detector 38, while its out-port 39.out (pin 40) is also the out-port 14.out of the unit 14 for computing the time of ultrasonic signal transmission counter the direction of the flow of the controlled media in the pipeline.

Figure 4:
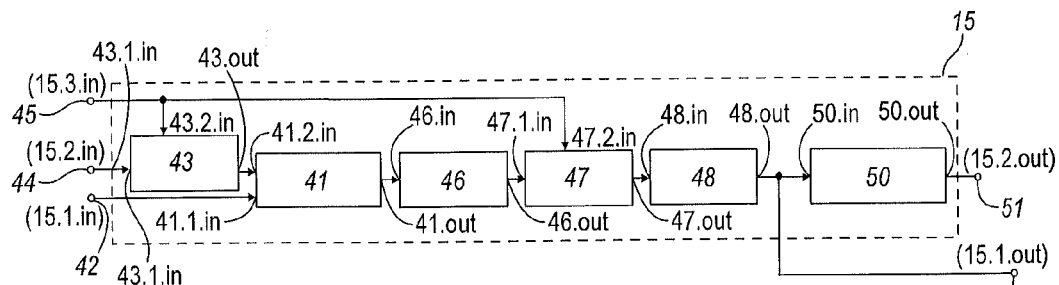
FIG. 4 shows a functional diagram of a unit for computing the time difference between ultrasonic signal transmission in and counter the direction of the flow of the CMP of the device in FIGS. 1a-1b.

The functional diagram of the unit 15 for computing the time difference between the ultrasonic signal transmission in and counter the direction of the flow of the CMP shown in FIG. 4 contains:

a multiplier 41 whose first in-port 41.1.in (through pin 42) is connected to the out-port 11.out of the first RAM 11 (to the first out-port 10.1.out of the memory unit 10);

a delay line 43, whose first in-port 43.1.in (through pin 44) is connected to the out-port 12.out of the second RAM 12 (to the second out-port 10.2.out of the memory unit 10), whose second in-port 43.2.in is connected (through pin 45) to the third out-port 17.3.out of the control driver 17, and whose out-port 43.out is connected to a second in-port 41.2.in of the multiplier 41;

an adder 46, whose in-port 46.in is connected to an out-port 41.out of the multiplier 41;

a RAM 47 whose first in-port 47.1.in is connected to an out-port 46.out of the adder 46 and whose second in-port 47.2.in is connected (through pin 45) to the third out-port 17.3.out of the control driver 17;

a peak detector 48 whose in-port 48.in is connected to an out-port 47.out of the RAM 47, while an out-port 48.out of the peak detector 48 (through pin 49) is also the first out-port 15.1.out of the unit 15 for computing the time difference between the ultrasonic signal transmission in and counter the direction of the flow of the CMP 1;

a code-to-code converter 50, whose in-port 50.in is connected to an out-port 48.out of the peak detector 48, while out-port 50.out of the code-to-code converter 50 (through pin 51) is also the second out-port 15.2.out of the unit 15 for computing the time difference between the ultrasonic signal transmission in and counter the direction of the flow of the CMP 1.

Figure 5:
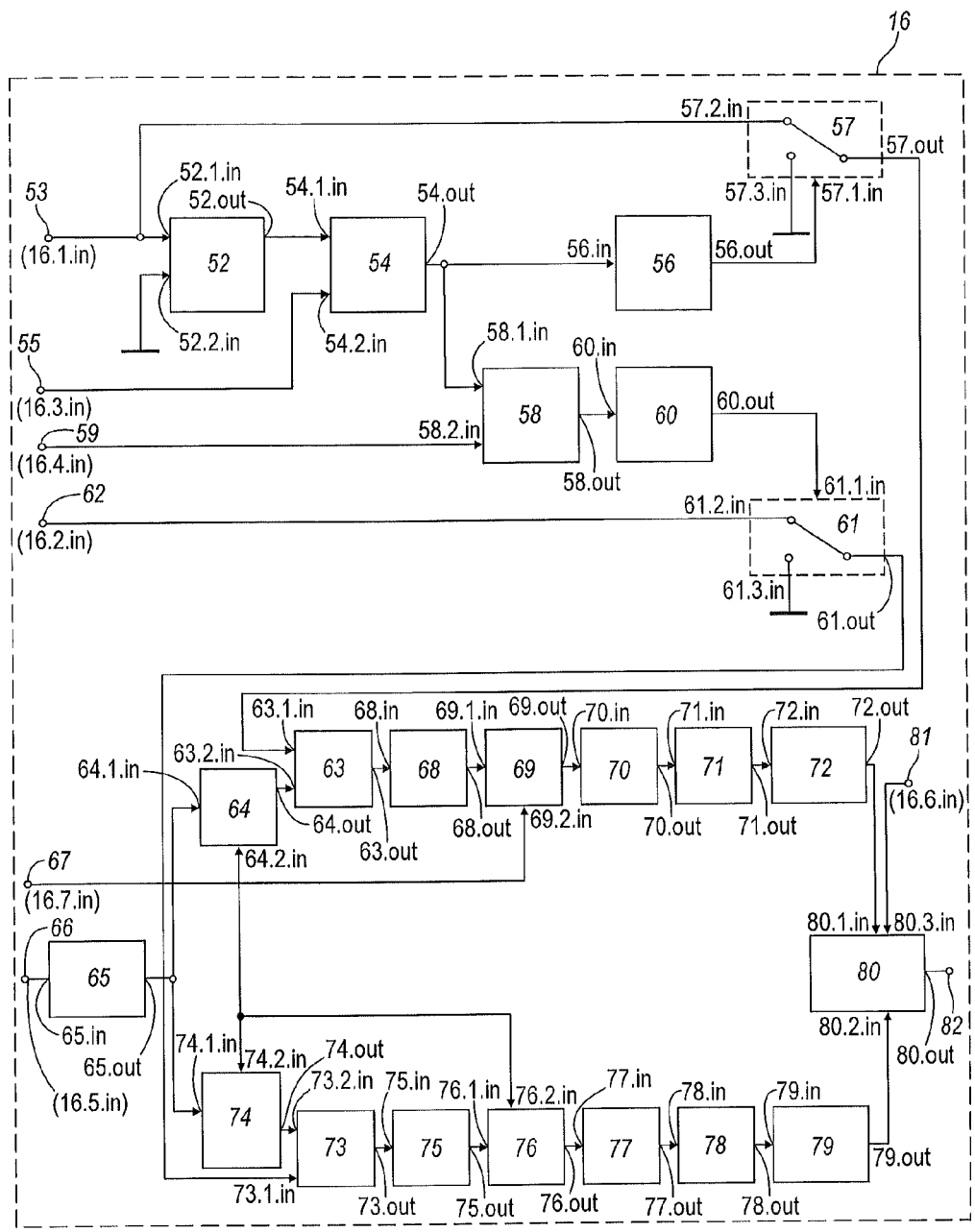
FIG. 5 shows a functional diagram of an additional unit for computing the time difference between ultrasonic signal transmission in and counter the direction of the flow of the CMP of the device in FIGS. 1a-1b.

The functional diagram of the additional unit 16 for computing the time difference between the ultrasonic signal transmission in and counter the direction of the flow of the CMP 1 shown in FIG. 5 contains:

a first comparator 52, whose first in-port 52.1.in (pin 53) is connected to the out-port 11.out of the first RAM 11 (to the first out-port 10.1.out of the memory unit 10), and whose second in-port 52.2.in is connected to the case of the device 107 for measuring the volume flow rate of the CMP 1;

a second comparator 54, whose first in-port 54.1.in is connected to a out-port 52.out of the first comparator 52, and whose second in-port 54.2.in (through pin 55 and through pin 28 (see FIG. 2)) is connected to the out-port 27.out of the peak detector 27 (to the first out-port 13.1.out of the unit 13 for computing the time of ultrasonic signal transmission in the direction of the flow of the CMP 1);

a first univibrator 56, whose in-port 56.in is connected to an out-port 54.out of the second comparator 54;

a first switch 57, whose control in-port 57.1.in is connected to an out-port 56.out of the first univibrator 56, whose first information in-port 57.2.in (through pin 53) is connected to the out-port 11.out of the first RAM 11 (to the first out-port 10.1.out of the memory unit 10), and whose second information in-port 57.3.in is connected to the case of the device 107 for measuring the volume flow rate of the CMP 1;

a first adder 58, whose first in-port 58.1.in is connected to the out-port 54.out of the second comparator 54, and whose second in-port 58.2.in (through pin 59 and pin 49, see FIG. 4) is connected to the out-port 48.out of the peak detector 48, i.e. to the first out-port 15.1.out of the unit 15 for computing the time difference between the ultrasonic signal transmission in and counter the direction of the flow of the CMP 1;

a second univibrator 60 whose in-port 60.in is connected to an out-port 58.out of the first adder 58;

a second switch 61, whose control in-port 61.1.in is connected to an out-port 60.out of the second univibrator 60, whose first information in-port 61.2.in (through pin 62) is connected to the out-port 12.out of the second RAM 12 (to the second out-port 10.2.out of the memory unit 10), and whose second information in-port 61.3.in is connected to the case of the device 107 for measuring the volume flow rate of the CMP 1;

a first multiplier 63, whose first in-port 63.1.in is connected to an out-port 57.out of the first switch 57;

a first delay line 64, whose first in-port 64.1.in is connected (through a phase changer 65 and pin 66) to the out-port 6.out of the ultrasonic signal source 6, whose second in-port 64.2.in is connected (through pin 67) to the third out-port 17.3.out of the of the control driver 17, and whose out-port 64.out is connected to a second in-port 63.2.in of the first multiplier 63;

a second adder 68, whose in-port 68.in is connected to an out-port 63.out of the first multiplier 63;

a first RAM 69, whose first in-port 69.1.in is connected to an out-port 68.out of the second adder 68 and whose second in-port 69.2.in is connected (through pin 67) to the third out-port 17.3.out of the control driver 17;

a first interpolator 70, whose in-port 70.in is connected to an out-port 69.out of the first RAM 69;

a first null detector 71, whose in-port 71.in is connected to an out-port 70.out of the first interpolator 70;

a first code-to-code converter 72, whose in-port 72.in is connected to an out-port 71.out of the first null detector 71;

a second multiplier 73, whose first in-port 73.1.in is connected to an out-port 61.out of the second switch 61;

a second delay line 74, whose first in-port 74.1.in is connected (through the phase changer 65 and pin 66) to the out-port 6.out of the ultrasonic signal source 6, whose its second in-port 74.2.in is connected (through pin 67) to the third out-port 17.3.out of the of the control driver 17, and whose out-port 74.out is connected to a second in-port 73.2.in of the second multiplier 73;

a third adder 75, whose in-port 75.in is connected to an out-port 73.out of the second multiplier 73;

a second RAM 76, whose first in-port 75.1.in is connected to out-port 75.out of the third adder 75 and whose second in-port 75.2.in is connected (through pin 67) is connected to the third out-port 17.3.out of the control driver 17;

a second interpolator 77, whose in-port 77.in is connected to the out-port of the second RAM 76;

a second null detector 78, whose in-port 78.in is connected to an out-port 77.out of the second interpolator 77;

a second code-to-code converter 79, whose in-port 79.in is connected to an out-port 78.out of the second null detector 78;

a fourth adder 80, whose first in-port 80.1.in is connected to an out-port 72.out of the first code-to-code converter 72, whose second, inverted, in-port 80.2.in is connected to an out-port 79.out of the second code-to-code converter 79, and whose third in-port 80.3.in is connected (through pin 81 and pin 51, see FIG. 4) to the second out-port 15.2.out of the unit 15 for computing the time difference between the ultrasonic signal transmission in and counter the direction of the flow of the CMP 1. And an out-port 80.out of the fourth adder 80 (pin 82) is also the out-port 16.out of the additional unit 16 for computing the time difference between the ultrasonic signal transmission in and counter the direction of the flow of the CMP 1.

Figure 6:
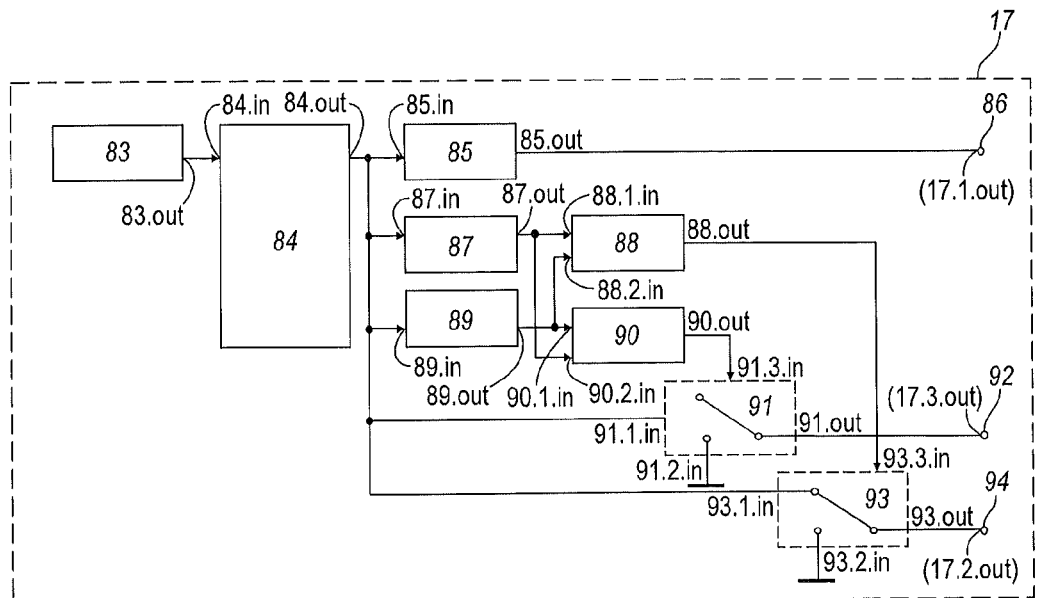
FIG. 6 shows a functional diagram of a control driver of the device in FIGS. 1a-1b.
Figure 7:
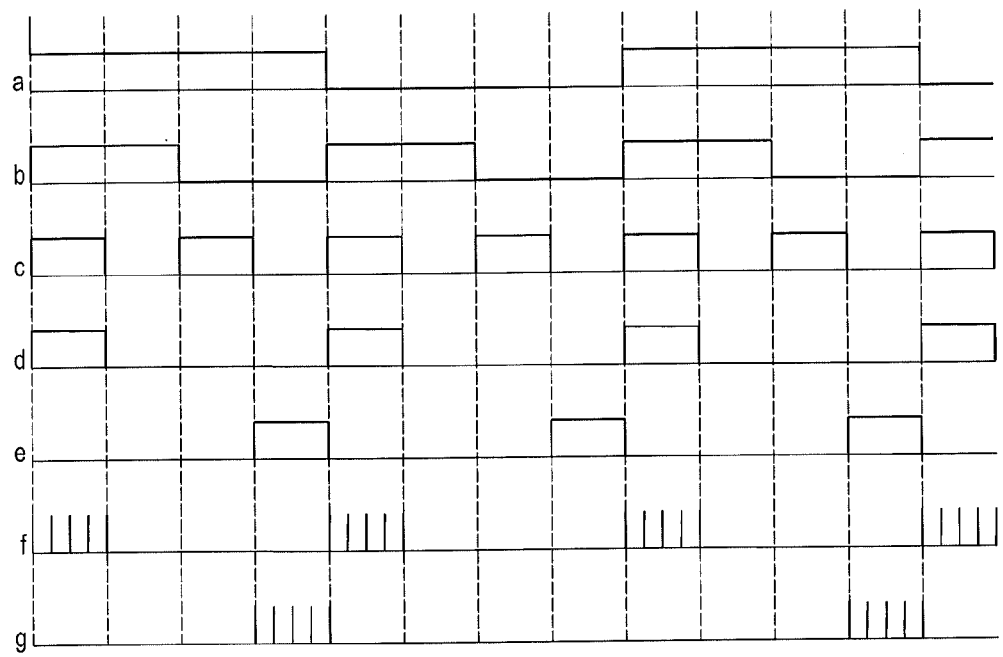
FIG. 7 shows time diagrams that help explain the operating principle of the control driver of the device in FIGS. 1a-1b.

The functional diagram of the control driver 17 shown in FIG. 6 contains:

a quartz generator 83 of high-frequency sine voltage;

a high frequency sine—square pulse train converter 84, whose in-port 84—in is connected to an out-port 83.out of the quartz generator 83;

a first divider 85, whose in-port 85.in is connected to an out-port 84.out of the high frequency sine—square pulse train converter 84, and the out-port 85.out of the first divider 85 (pin 86) is also the first out-port 17.1.out of the control driver 17;

a second divider 87, whose in-port 87.in is connected to the out-port 84.out of the high frequency sine—square pulse train converter 84;

an AND-circuit 88, whose first in-port 88.1.in is connected to an out-port 87.out of the second divider 87;

a third divider 89, whose in-port 89.in is connected to the out-port 84.out of the high frequency sine—square pulse train converter 84 and an out-port 89.out is connected a second in-port 88.2.in of the AND-circuit 88;

an OR-NOT circuit 90, whose first in-port 90.1.in is connected to the out-port 89.out of the third divider, and whose second in-port 90.2.in is connected to the out-port 87.out of the second divider 87;

a first switch 91, whose first information in-port 91.1.in is connected to the out-port 84.out of the high frequency sine—square pulse train converter 84, whose second information in-port 91.2.in is connected to the case of the device 107 for measuring the volume flow rate of the CMP 1, and whose control in-port 91.3.in is connected to an out-port 90.out of the AND-OR-circuit 90, while an out-port 91.out of the first switch 91 (pin 92) is the third out-port 17.3.out of the control driver 17;

a second switch 93, whose first information in-port 93.1.in is connected to the out-port 84.out of the high frequency sine—square pulse train converter 84, whose second information in-port 93.2.in is connected to the case of the device 107 for measuring the volume flow rate of the CMP 1, and whose control in-port 93.3.in is connected to an out-port 88.out of the AND-circuit 88, while the out-port 93.out of the second switch 93 (pin 94) is the second out-port 17.2.out of the control driver 17;

The following codes are used for time diagrams of the control driver that are shown in FIG. 7:

"a"—rectangular impulses at the out-port 85.out of the first divider 85 (pin 86);

"b"—rectangular impulses at the out-port 87.out of the second divider 87;

"c"—rectangular impulses at the out-port 89.out of the third divider 89;

"d"—rectangular impulses at the control in-port 93.3.in of the second switch 93;

"e"—rectangular impulses at the control in-port 91.3.in of the first switch 91;

"f"—rectangular impulses at the out-port 93.out of the second controlled switch 93 (pin 94);

"g"—rectangular impulses at the output 91.out of the first controlled switch 91 (pin 92).

Figure 8:
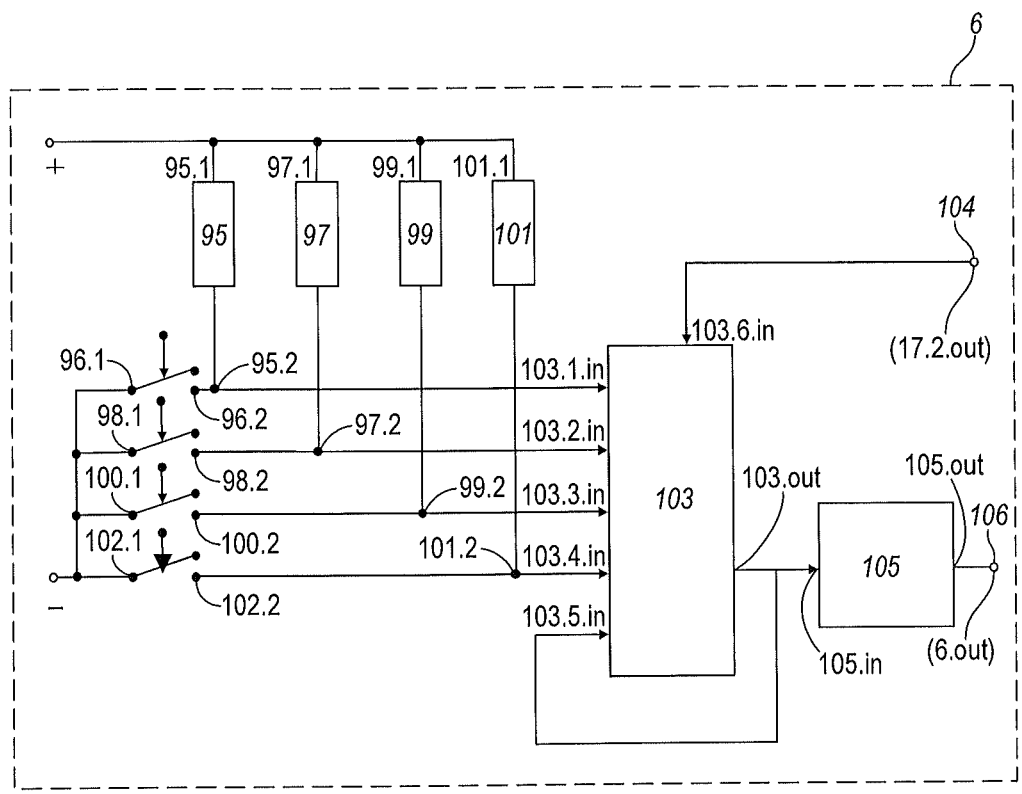
FIG. 8 shows a functional diagram of an ultrasonic signal source of the device in FIGS. 1a-1b.

The ultrasonic signal source 6, whose functional diagram is shown in FIG. 8, contains:

a DC power source (shown by its positive and negative pins);

a first resistor 95, whose first pin 95.1 is connected to a positive pin of the DC power source;

a first switch 96, whose first pin 96.1 is connected to a negative pin of the DC power source, and whose second pin 96.2 is connected to a second pin 95.2 of the first resistor 95;

a second resistor 97, whose first pin 97.1 is connected to the positive pin of the DC power source;

a second switch 98 whose first pin 98.1 is connected to the negative pin of the DC power source, and whose second pin 98.2 is connected to a second pin 97.2 of the second resistor 97;

a third resistor 99, whose first pin 99.1 is connected to the positive pin of the DC power source;

a third switch 100, whose first pin 100.1 is connected to the negative pin of the DC power source, and whose second pin 100.2 is connected to the second pin 99.2 of the third resistor 99;

a fourth resistor 101, whose first pin 101.1 is connected to the positive pin of the DC power source;

a fourth switch 102, whose first pin 102.1 is connected to the negative pin of the DC power source, and whose second pin 102.2 is connected to the second pin 101.2 of the fourth resistor 101;

an adder 103 whose first, second, third, and fourth in-ports 103.1.in 103.4.in are connected to the second pins of the first, second, third, and fourth switches 96.2, 98.2, 100.2, and 102.2, respectively, whereas a fifth in-port 103.5.in of the adder 103 is connected to an out-port 103.out of the adder 103, and its sixth in-port 103.6.in is connected (through pin 104 and pin 94 (see FIG. 6)) to the second out-port 17.2.out of the control driver 17;

a memory unit 105, whose in-port 105.in is connected to the out-port 103.out of the adder 103, while an out-port 105.out of the memory unit 105 (pin 106) is the out-port 6.out of the ultrasonic signal source 6.

IC AD5424 published in the source ©2005 Analog Devices, Inc. C03160-0-3/05(A) may be used as the digital-to-analog converter 5.

RAM CY6264 published in the source "Cypress Semiconductor Corporation", 1996. 38-00425-A may be used as the first RAM (non-inverted) 11 and the second RAM (inverted) 12 (memory unit 10).

IC KR15331R7 together with micro-circuits KR1533 KP7 published on pp. 121 . . . 194 of the guide "Logical Integral systems KR1533, KR1554".—Moscow: LLP "Binom", 1993 by I. I. Petrovsky, A. V. Pribylsky, A. A. Troyan, V. S. Chuvelev, may be used as the controlled delay lines—22, 33, 43, 64 and 74.

Multipliers described on p. 147 of the book "Digital devices based on integral circuits in communication equipment"—Moscow, "Svyaz Publishing", 1979, by L. M. Goldenberg, Yu. T. Butylsky, M. N. Polyak, may be used as the multipliers 20, 31, 41, 63 and 73.

Adders MC74F283 published in the source Motorola, "Fast and LS TTL Data" 4-146 may be used as the adders 25, 36, 46, 68 and 75.

RAM CY6264 published in the source "Cypress Semiconductor Corporation" 1996. 38-00425-A, may be used as RAM 26, 37, 47, 69 and 76.

Interpolators described on p. 633 in the book by Emmanual C. Ifeachor, Barrie W. Jervis "Digital Signal Processing: A Practical Approach", $2^{nd}$ Edition: translated from English—Moscow, "Williams Publishing", 2004, may be used as the first and the second interpolators 70 and 77.

Code-to-code converters described on p. 318 in the guide by U. Titze, K. Schenk "Semiconductor Circuit Engineering", translated from German—Moscow, Mir Publishing, 1982, may be used as the code-to-code converters 29, 39, 50, 72 and 79.

IC SN74LS682 published in the source Motorola, "Fast and LS TTL Data" 5-60 may be used as the first and the second comparators 52 and 54.

IC KR1533AG3 published on p. 28 in the guide "Logical Integral systems KR1533, KR1554" LLP "Binom", 1993 by I. I. Petrovsky, A. V. Pribylsky, A. A. Troyan, V. S. Chuvelev, may be used as the first and the second univibrators 56 and 60.

IC KR1533LAZ published on p. 226 in the guide "Logical Integral systems KR1533, KR1554".LLP "Binom", 1993 by I. I. Petrovsky, A. V. Pribylsky, A. A. Troyan, V. S. Chuvelev, may be used as the AND-circuit 88.

IC KR1533LL1 published on p. 268 in the guide "Logical Integral systems KR1533, KR1554".LLP "Binom", 1993 by I. I. Petrovsky, A. V. Pribylsky, A. A. Troyan, V. S. Chuvelev, may be used as the OR-NOT circuit-90.

Adders MC74F283 published in the source Motorola, "Fast and LS TTL Data" 4-146 may be used as adders 58, 80 and 103.

Quartz generator described on p. 317 in the guide by P. Horovitz, W. Hill "The Art of Circuit Engineering", Issue 1, translated from English, 4$^{th}$ Edition, Revised and Updated—Moscow, Mir Publishing, 1993, may be used as the quartz generator 83.

IC SN74LS682 published in the source Motorola, "Fast and LS TTL Data" 5-603 may be used as null detectors 71 and 78.

IC KR1533 KP16 published on p. 211 in the guide "Logical Integral systems KR1533, KR1554".LLP "Binom", 1993 by I. I. Petrovsky, A. V. Pribylsky, A. A. Troyan, V. S. Chuvelev, may be used as the switches 96, 98, 100 and 102.

IC MAX941 published in the source 2007 Maxim Integrated Products 19-0229; Rev 7; 2/07 may be used as the high frequency sine—square pulse train converter 84.

IC KR15331E1 published on p. 82 in the guide "Logical Integral systems KR1533, KR1554".LLP "Binom", 1993 by I. I. Petrovsky, A. V. Pribylsky, A. A. Troyan, V. S. Chuvelev, may be used as the first, the second, and the third dividers 85, 87 and 89.

IC KR1533 KP16 published on p. 211 in the guide "Logical Integral systems KR1533, KR1554".LLP "Binom", 1993 by I. I. Petrovsky, A. V. Pribylsky, A. A. Troyan, V. S. Chuvelev may be used as the controlled switches 57, 61, 91 and 93.

Controller MC68HC711E9 described on p. 242 in the guide by I. I. Shagurin "Motorola Microprocessors and Microcontrollers"—Moscow, Radio I Svyaz Publishing, 1998, may be used as the unit for measuring the volume flow rate of the CMP (computing unit) 18.

All other elements included in the device for measuring the volume flow rate of the CMP are widely-known and have been published in the literature on computing equipment.

It should be noted, however, that the following units:
6—ultrasonic signal source;
9—A/D converter;
10—memory unit containing RAM 11 and 12;
13—unit for computing the time of ultrasonic signal transmission in the direction of the flow of the CMP;
14—unit for computing the time of ultrasonic signal transmission counter the direction of the flow of the CMP;
15—unit for computing the time difference between ultrasonic signal transmission in and counter the direction of the flow of the CMP;
16—additional unit for computing the time difference between ultrasonic signal transmission in and counter the direction of the flow of the CMP;
17—control driver; and
18—unit for measuring the volume flow rate of the CMP
  may be hardware-based, hardware-and-software-based, or software-based, e.g. by using the processor DSP TMS320F28332 published in the source Texas Instruments. SPRS439-June 2007.

In implementing the method of the present invention in the device 107, control signals are formed by the control driver 17. High frequency sine voltage is generated in the quartz generator 83 (see FIG. 6), and is converted by the converter 84 into the sequence of pulses of rectangular shape to be applied to the in-ports of the first divider 85, second divider 87, and the third divider 89, which produce the following pulse trains according to set division factors:

at the out-port 85.out of the first divider 85—a sequence of rectangular impulses (see FIG. 7, pos. 'a'), which are the control impulses sent from the out-port 85.out of the first divider 85 (through pin 86) to the second in-port 4.2.in of the first multiplexer 4, to the third in-port 7.3.in of the second multiplexer 7, and to the second in-port 10.2.in of the memory unit 10 (to the inverted second in-port 12.2.in of the second RAM 12, and the direct second in-port 11.2.in of the first RAM 11);

at the out-port 87.out of the second divider 87—a sequence of rectangular impulses (see FIG. 7, pos. 'b'), which is sent to the first in-port 88.1.in of the AND-circuit 88 and the second in-port 90.2.in of the OR-NOT-circuit 90;

at the out-port 89.out of the third divider 89—a sequence of rectangular impulses (see FIG. 7, pos. 'c'), which is sent to the second in-port 88.2.in of the AND-circuit 88 and the first in-port 90.2.in of the OR-NOT-circuit 90.

By sending rectangular impulses to the in-ports of the AND-circuit 88, the control signal for controlling the second switch 93 is formed (see FIG. 7, pos. 'd') at its out-port 88.out.

By sending rectangular impulses to the in-ports of the AND-OR-circuit 90, the control signal for controlling the first switch 91 is formed (see FIG. 7, pos. 'e') at its out-port 90.out.

As the second switch 93 is triggered, rectangular impulses (see FIG. 7, pos. 'f') appear at its out-port 93.out (pin—94, see FIG. 6). These impulses serve as the control signals for the digital-to-analog converter 5 (they are sent to its second in-port 5.2.in), the control signals for the analog-to-digital converter 9 (they are sent to its second in-port 9.2.in) and the control signals for the ultrasonic signal source 6, which are sent to its in-port 6.in (to pin 104 and then to the sixth in-port 103.6.in of the adder 103, see FIG. 8).

As the first switch 91 is triggered, rectangular impulses (see FIG. 7, pos. 'g') appear at its out-port 91.out (pin 92, see FIG. 6). They serve as the control signals: for delay lines 22 (FIG. 2); 33 (FIG. 3); 43 (FIG. 4); 64 (FIG. 5); 74 (FIG. 5) and for RAM 26 (FIG. 2), 37 (FIG. 3), 47 (FIG. 4), 69 and 76 (FIG. 5).

Digital ultrasonic signals that appear at the out-port 6.out pin 106 in FIG. 8) of the ultrasonic signal source 6 are formed by connecting the first pins 95.1, 97.1, 99.1, and 101.1 of the first, the second, the third, and the fourth resistors 95, 97, 99 and 101 directly, and connecting their second pins 95.1, 97.2, 99.2 and 101.2 through the first, the second, the third, and the fourth switches 96, 98, 100 and 102, to the pins of the DC power source, supplying voltages as codes (e.g. 1.0.1.1.) from the second pins of the first, the second, the third, and the fourth resistors 95, 97, 99 and 101 to the respective in-ports 103.1.in, 103.2.in, 103.3.in and 103.4.in of the adder 103, summing the codes sent to its in-ports by each leading edge of the control signals sent from the out-port 17.2.out of the control driver 17 (to pin 104 and to the sixth in-port 103.6.in of the adder 103, see FIG. 8) and sending the code from the out-port 103.out of the adder 103 to the address in-port 105.in of the memory unit 105, in which the pre-recorded digital codes of the sine signal are stored. From the output 6.out of the ultrasonic signal source 6, the digital ultrasonic signals are transmitted to the first in-port 5.1.in of the digital-to-analog converter 5, which converts the digital ultrasonic signals into analog signals that go to the first in-port 4.1.in of the first multiplexer 4. From the first out-port 17.1.out of the control driver 17 the sequence of impulses is transmitted to the second, control, in-port 4.2.in of the first multiplexer 4. This sequence of impulses sets the connection between the digital-to-analog converter 5 out-port 5.out and the first, 4.1.out, or the second, 4.2.out, out-port of the first multiplexer 4. As this takes place, from the first out-port 4.1.out of the first multiplexer 4 analog ultrasonic signals are transmitted to the first transmitting-receiving radiator 2 of ultrasonic signals to subsequently pass in the direction of the flow of the CMP 1, whereas from the second out-port 4.2.out of the first multiplexer 4 analog ultrasonic signals are transmitted to the second transmitting-receiving radiator 3 to subsequently pass counter the direction of the flow of the CMP 1.

From the pin 2.in/out of the first transmitting-receiving radiator 2 of ultrasonic signals ultrasonic signals that have passed counter the direction of the flow of the CMP 1 are delivered to the first in-port 7.1.in of the second multiplexer 7.

From the pin 3.in/out of the second transmitting-receiving radiator 3 of ultrasonic signals ultrasonic signals that have passed in the direction of the flow of the CMP 1 are delivered to the second in-port 7.2.in of the second multiplexer 7.

By the action of the control impulses transmitted from the first out-port 17.1.out of the control driver 17 to the third, control, in-port 7.3.in of the second multiplexer 7, ultrasonic signals that have passed in and counter the direction of the flow of the CMP 1 are alternately delivered from the output 7.out of the second multiplexer 7 to the in-port 8.in of the ultrasonic signal amplifier 8, which, using the automatic gain control, ensures the necessary signal level at the first in-port 9.1.in of the analog-to-digital converter 9, the second in-port 9.2.in of which receives impulse signals from the second out-port 17.2.out of the control driver 17 that secure converting the analog ultrasonic signals into digital codes at the sampling rate "$f_1$" and the alternate reception of the digital codes of ultrasonic signals that have passed in and counter the direction of the flow of the CMP 1 at the out-port 9.out of the analog-to-digital converter 9.

Digital codes of the ultrasonic signals that have passed in and counter the direction of the flow of the CMP 1 are sent from the out-port 9.out of the analog-to-digital converter 9 to the first in-port 10.1.in of the memory unit 10, and then to the first in-port 11.1.in of the first RAM 11 and the first in-port 12.1.in of the second RAM 12. Controlled by the impulses sent from the first out-port 17.1.out of the control driver 17 to the second in-port 10.2.in of the memory unit 10 (to the inverted second in-port 12.2.in of the second RAM 12 and the second (direct) in-port 11.2.in of the first RAM 11), the digital codes of ultrasonic signals that have passed in the direction of the flow of the CMP1 are written into the cells of the first RAM 11, and the digital codes of ultrasonic signals that have passed counter the direction of the flow of the CMP1 are written into the cells of the second RAM 12, respectively.

Digital codes of ultrasonic signals that have passed in the direction of the flow of the CMP1 are transmitted from the out-port 11.out of the first RAM 11 and, respectively, from the first out-port 10.1.out of the memory unit 10, to the first in-port 13.1.in (pin 21) of the unit 13 for computing the time of ultrasonic signal transmission in the direction of the flow of the CMP 1, and then to the first in-port 20.1.in of the multiplier 20 (see FIG. 2). Digital codes of ultrasonic signals are transmitted from the out-port 6.out of the ultrasonic signal source 6 (from the out-port 105.out of the memory unit 105, from the pin 106) to the second in-port 13.2.in (pin 23 and then to the first in-port 22.2.in of the delay line 22) of the unit 13 for computing the time of ultrasonic signal transmission in the direction of the flow of the CMP 1. Controlling signals are transmitted from the third out-port 17.3.out of the control driver 17 (from the out-port 91.out of the first switch 91, from pin 92 (see FIG. 6)) to the third in-port 13.3.in (to pin 24 (see FIG. 2) and then to the second in-port 22.2.in of the delay line 22) of the unit 13 for computing the time of ultrasonic signal transmission in the direction of the flow of the CMP 1.

Thus, the codes of ultrasonic signals digitized at the sampling rate of "$f_1$" that have passed in the direction of the flow of the CMP 1 are sent to the first in-port 20.1.in of the multiplier 20 (see FIG. 2), and the codes of ultrasonic signals from the out-port 6.out of the ultrasonic signal source 6 are sent to the first in-port 22.1.in of the delay line 22 controlled by the control impulses received from the third out-port 17.3.out (from pin 92, see FIG. 6) of the control driver 17 with the sampling rate of "$f_1$" (see FIG. 7, pos. 'g'), and, with each leading edge of the control impulses, the delay time of the delay line 22 changes by one interval "$1/f_1$", to thereby secure transmitting the codes of ultrasonic signals, delayed for "0÷N" intervals of sampling rate equal to "$f_1$" (depending on the control signal leading edge number) from the output 6.out of the ultrasonic signal source 6 to the second in-port 20.2.in of the multiplier 20.

Multiplier 20 performs the point-by-point multiplication of the codes sent to its first and second in-ports 20.1.in and 20.2.in. The result of the point-by-point multiplication is sent to the in-port 25.in of the adder 25, in which the value of the correlation function of the ultrasonic signal codes for signals that have passed in the direction of the flow of the CMP 1 and the ultrasonic signal codes received from the out-port 6.out of the ultrasonic signal source 6 is obtained at its out-port 25.out after summing up the product of the respective points.

The obtained value of the correlation function of codes is recorded into the cells of the RAM 26 by the trailing edge of the control signal (impulse) transmitted from the third out-port 17.3.out of the control driver 17 to the second in-port 26.2.in of the RAM 26.

Thus, after the "N" control signal impulses have passed, the RAM 26 contains the mutual correlation function of the codes of ultrasonic signals that have passed in the direction of the flow of the CMP 1, and the codes of ultrasonic signals received from the out-port 6.out of the ultrasonic signal source 6, which is sent to the in-port 27.in of the peak detector 27 which determines the code of the position address for the correlation function maximum value recorded in the RAM 26.

From the output 27.out of the peak detector 27, the code of the position address for the maximum value of the correlation function of the codes of ultrasonic signals, which have passed in the direction of the flow of the CMP 1, and the codes of ultrasonic signals received from the out-port 6.out of the ultrasonic signal source 6 is sent to the out-port 13.1.out (pin 28) of the unit 13 for computing the time of ultrasonic signal transmission in the direction of the flow of the CMP 1, and to the in-port 29.in of the code-to-code converter 29, at whose out-port 29.out a code of time intervals between the ultrasonic signals that enter the controlled medium of the pipeline 1 and the ultrasonic signals that have passed in the direction of the flow of the CMP (i.e. the code $\Delta T_1$ that corresponds to the time of ultrasonic signal transmission in the direction of the flow of the CMP 1) is formed.

Digital codes of ultrasonic signals that have passed counter the direction of the flow of the CMP 1 are transmitted from the out-port 12.out of the second RAM 12 and, respectively, from the second out-port 10.2.out of the memory unit 10 to the first in-port 14.1.in (to pin 32 and then to the in-port 31.in of the multiplier 31, see FIG. 3) of the unit 14 for computing the time of ultrasonic signal transmission counter the direction of the flow of the CMP 1.

From the out-port 6.out of the ultrasonic signal source 6 (from the out-port 105.out of the memory unit 105, from pin 106), digital codes of ultrasonic signals are sent to the second in-port 14.2.in (to pin 34 and then to the first in-port 33.1.in of the delay line 33) of the unit 14 for computing the time of ultrasonic signal transmission counter the direction of the flow of the CMP 1. From the third out-port 17.3.out of the control driver 17 (from the out-port 91.out of the first switch 91, from pin 92 (see FIG. 6)) control signals are sent to the third in-port 14.3.in (to pin 35 (see FIG. 3) and then to the second in-port 33.2.in of the delay line 33)) of the unit 14 for computing the time of ultrasonic signal transmission counter the direction of the flow of the CMP 1.

That is, the codes of ultrasonic signals digitized at the sampling rate of "$f_1$" that have passed counter the direction of the flow of the CMP 1 enter the first in-port 31. Lin of the multiplier 31 (see FIG. 3) and the codes of ultrasonic signals from the out-port 6.out of the ultrasonic signal source 6 enter the first in-port 33.1.in of the delay line 33, which is controlled by the control impulses provided from the third out-port 17.3.out (from pin 92, see FIG. 6) of the control driver 17 at the sampling rate of "$f_1$" (see FIG. 7, pos. 'g'), and the delay time of the delay line 33 changes by each leading edge of the control signals by one interval equal to "$1/f_1$", whereby providing the codes of ultrasonic signals, delayed for "0÷N" intervals of sampling rate equal to "$f_1$" depending on the number of the control signal leading edge, to the second in-port 31.2.in of the multiplier 31 is secured.

Multiplier 31 performs the point-by-point multiplication of the codes that entered its first, 31.1.in, and second, 31.2.in, in-ports. The result of the point-by-point multiplication appears at the in-port 36.in of the adder 36, from which, after summing up the products of the respective points, the value of the correlation function of the codes of the ultrasonic signals that have passed counter the direction of the flow of the CMP 1 and of the ultrasonic signal codes received from the out-port 6.out of the ultrasonic signal source 6 is obtained at its out-port 36.out. By the trailing edge of the control signal (impulse) transmitted from the third out-port 17.3.out of the control driver 17 to the second in-port 37.2.in of the RAM 37, the obtained value of the correlation function of codes is written into the cells of the RAM 37.

Thus, after the "N" control signal impulses have passed, the RAM 37 contains the mutual correlation function of the codes of ultrasonic signals that have passed counter the direction of the flow of the CMP 1, and the codes of ultrasonic signals received from the out-port 6.out of the ultrasonic signal source 6, which is sent to the in-port 38.in of the peak detector 38 which determines the code of the position address for the correlation function maximum value recorded in the RAM 37.

From the output 38.out of the peak detector 38, the code of the position address for the maximum value of the correlation function of the codes of ultrasonic signals, which have passed counter the direction of the flow of the CMP 1, and of the codes of ultrasonic signals received from the out-port 6.out of the ultrasonic signal source 6 enters the in-port 39.in of the code-to-code converter 39, at whose out-port 39.out a code of time intervals between the ultrasonic signals that enter the controlled medium of the pipeline 1 and the ultrasonic signals that have passed counter the direction of the flow of the CMP (i.e. the code $\Delta T_2$ that corresponds to the time of ultrasonic signal transmission counter the direction of the flow of the CMP 1) is formed.

From the out-port 11.out of the first RAM 11, and, from the first out-port 10.1.out of the memory unit 10 respectively, the digital codes of ultrasonic signals that have passed in the direction of the flow of the CMP 1 are sent to the first in-port 15.1.in (to pin 42 and then the in-port 41.1.in of the multiplier 41, see FIG. 4) of the unit 15 for computing the time difference of the ultrasonic signal transmission in and counter the direction of the flow of the CMP 1. From the out-port 12.out of the second RAM 12, and the second out-port 10.2.out of the memory unit 10 respectively, the digital codes of ultrasonic signals that have passed counter the direction of the flow of the CMP 1 are sent to the second in-port 15.2.in (to pin 44 and then the first in-port 43.1.in of the delay line 43, see FIG. 4) of the unit 15 for computing the time difference of the ultrasonic signal transmission in and counter the direction of the flow of the CMP 1.

From the third out-port 17.3.out of the control driver 17 (from the out-port 91.out of the first switch 91, and further from pin 92 (see FIG. 6)), control signals are provided to the third in-port 15.3.in (to pin 45 and then to the second in-port 43.2.in of the delay line 43 (see FIG. 4)) of the unit 15 for computing the time difference of the ultrasonic signal transmission in and counter the direction of the flow of the CMP 1.

That is, the codes of ultrasonic signals digitized at the sampling rate of "$f_1$" that have passed in the direction of the flow of the CMP 1 enter the first in-port 41.1.in of the multiplier 41 (see FIG. 4) and the codes of ultrasonic signals digitized at the sampling rate of "$f_1$" that have passed counter the direction of the flow of the CMP 1 enter the first in-port 43.1.in of the delay line 43 controlled by the control signals received from the third out-port 17.3.out (from pin 92, see FIG. 6) of the control driver 17 with the sampling rate of "$f_1$" (see FIG. 7, pos. 'g'), the delay line 43 delay time changing by one interval equal to "$1/f_1$" with each leading edge of the control signals, whereby providing the codes of ultrasonic signals that have passed counter the direction of the flow of the controlled media in the pipeline 1 and been delayed for "0÷N" intervals of sampling rate equal to "$f_1$" (depending on the number of the control signal leading edge) to the second in-port 41.2.in of the multiplier 41 is secured.

Multiplier 41 performs the point-by-point multiplication of the codes that entered its first, 41.1.in, and second, 41.2.in, in-ports. The point-by-point multiplication result is applied to the in-port 46.in of the adder 46, in which the value of the correlation function of the ultrasonic signal codes for signals that have passed in the direction of the flow of the CMP 1 and signals that have passed counter the direction of the flow of the CMP 1 is obtained at its out-port 41.out after summing up the products of the respective points.

By the trailing edge of the control signal (impulse) transmitted from the third out-port 17.3.out of the control driver 17 to the second in-port 47.2.in of the RAM 47, the obtained value of the correlation function of codes is written into the cells of the RAM 47.

Thus after "N" control signal impulses have passed, the RAM 47 contains the mutual correlation function of the codes of ultrasonic signals that have passed in the direction of the flow of the CMP 1 and ultrasonic signals that have passed counter the direction of the flow of the CMP 1, which is sent to the in-port 48.in of the peak detector 48 which determines the code of the position address for the correlation function maximum value written in the RAM 47.

The code of the position address for maximum value of the correlation function of the codes of ultrasonic signals that have passed in the direction of the flow of the CMP 1 and the codes of ultrasonic signals that have passed counter the direction of the flow of the CMP 1 enters pin 49 of the unit 15 for computing the time difference of the ultrasonic signal transmission in and counter the direction of the flow of the CMP 1 and the in-port 50.in of the code-to-code converter 50, at whose out-port 50.out (pin 51, output 15.2.out of the unit 15) code ($\Delta T_0$) of the time difference of the ultrasonic signal transmission in and counter the direction of the flow of the CMP 1 is formed.

From the first out-port 10.1.out of the memory unit 10 (from the out-port 11.out of the RAM 11) the codes of ultrasonic signals that have passed in the direction of the flow of the CMP 1 and digitized at the sampling rate of "$f_1$" enter the first in-port 16.1.in (to pin 53 and then the first in-port 52.1.in of the first comparator 52, see FIG. 5) of the additional unit 16 for computing the time difference of the ultrasonic signal transmission in and counter the direction of the flow of the CMP 1.

At the out-port 52.out of the first comparator 52, an array of address codes corresponding to the moments of zero crossing for the codes of ultrasonic signals that have passed in the direction of the flow of the CMP 1 is formed as the result of comparing the codes of ultrasonic signals digitized with the sampling rate of "$f_1$" and having passed in the direction of the flow of the CMP 1 with zero.

The obtained array of address codes is sent to the first in-port 54.1.in of the second comparator 54, to the second in-port 54.2.in of which (to pin 55, to the third in-port 16.3.in of the additional unit 16 for computing the time difference of the ultrasonic signal transmission in and counter the direction of the flow of the CMP 1) the code of the position address for maximum value of the correlation function, stored in the RAM 26 is sent from the first out-port 13.1.out of the unit 13 for computing the time of ultrasonic signal transmission in the direction of the flow of the CMP 1 (from the out-port 27.out of the peak detector 27 (from pin 28, see FIG. 2)).

As the result of comparing the codes sent to the first, 54.1.in, and the second, 54.2.in, in-ports of the second comparator 54, code of zero crossing moment address for codes of ultrasonic signals that have passed in the direction of the flow of the CMP 1, which is the closest to the code of the position address for maximum value of the correlation function, recorded in the RAM 26 (see FIG. 2) will be determined at its out-port.

The obtained code of zero crossing moment address for codes of ultrasonic signals that have passed in the direction of the flow of the CMP 1, which is the closest to the code of the position address for maximum value of the correlation function stored in the RAM 26, enters the in-port 56.in of the first univibrator 56 and starts it up. Thus, a signal for controlling the first switch 57 will be formed at the out-port 56.out of the first univibrator 56. Transmitted to the first in-port 57.1.in of the switch 57 are the codes of ultrasonic signals that have passed in the direction of the flow of the CMP 1, while its second in-port 57.2.in will receive a zero signal.

By the action of the control signal, a part of codes of ultrasonic signals digitized with the sampling rate of "$f_1$" and having passed in the direction of the flow of the CMP 1, which is the part corresponding to the maximum value of the correlation function, will appear at the out-port 57.out of the first switch 57.

Delivered from the out-port 54.out of the second comparator 54 to the first in-port 58.1.in of the first adder 58 is the code of zero crossing moment address for codes of ultrasonic signals that have passed in the direction of the flow of the CMP 1 which is the closest to the code of the position address for maximum value of the correlation function written in the RAM 26 (see FIG. 2), whereas provided to the second in-port 58.2.in of the first adder 58 (to pin 59, the fourth in-port 16.4.in of the additional unit-16 for computing the time difference of the ultrasonic signal transmission in and counter the direction of the flow of the CMP 1) from the first out-port of the unit 15 for computing the time difference of the ultrasonic signal transmission in and counter the direction of the flow of the CMP 1 (from the out-port of the peak detector 48 (from the pin 49, see FIG. 4)) is the code of the position address for the maximum value of the correlation function of the codes of ultrasonic signals that have passed in the direction of the flow of the CMP 1 and the codes of ultrasonic signals that have passed counter the direction of the flow of the CMP 1.

The result of summing up the codes that were sent to the first, 58.1.in, and the second, 58.2.in, in-ports of the first adder 58 is sent to the in-port 60.in of the second univibrator 60 and starts it up. Thus, a signal for controlling (via the input 61.1.in) the second switch 61 will be formed at the out-port 60.out of the second univibrator 60. Sent to the first in-port 61.2.in of the switch (to pin 62, from the second out-port 10.2.out of the memory unit 10, from the out-port 12.out of the second RAM 12, see FIG. 1) are the codes of ultrasonic that have passed counter the direction of the flow of the CMP 1, while its second in-port 61.3.in will receive zero signal. It is to be understood that pin 62 is the second in-port 16.2.in of the additional unit16 for computing the time difference of the ultrasonic signal transmission in and counter the direction of the flow of the CMP 1.

By the action of the control signal, a part of codes of ultrasonic signals digitized at the sampling rate of "$f_1$" that have passed counter the direction of the flow of the controlled medium in the pipeline 1, which is the part corresponding to the maximum value of the correlation function, will appear at the out-port 61.out of the second switch 61. Thus, the maximum signal-to-noise ratio and, accordingly, a high precision in measuring the time difference of the ultrasonic signal transmission in and counter the direction of the flow of the CMP 1 is effected.

Transmitted from the out-port 57.out of the first switch 57 (see FIG. 5) to the first in-port 63.1.in of the first multiplier 63 is a part of codes of ultrasonic signals digitized with the sampling rate of "$f_1$" that have passed in the direction of the flow of the controlled medium in the pipeline 1. Codes of ultrasonic signals are sent to the first in-port 64.1.in of the first delay line 64 from the out-port 105.out of the memory unit 105 (from pin 106, see FIG. 8) of the ultrasonic signal source 6 (to pin 66, which is the fifth in-port 16.5.in of the additional unit 16 for computing the time difference of the ultrasonic signal transmission in and counter the direction of the flow of the CMP 1, and then via 90° phase changer 65), whereas pulses at the sampling rate of "$f_1$" (shown in FIG. 7, pos. 'g') are sent from the third out-port 17.3.out of the control driver 17 (from pin 92, see FIG. 6) to the second in-port 64.2.in of the first delay line 64 (to pin 67 (see FIG. 5), which is the seventh in-port 16.7.in of the additional unit 16 for computing the time difference of the ultrasonic signal transmission in and counter the direction of the flow of the CMP 1. By each leading edge of the control signals, the delay time of the first delay line 64 changes by one interval equal to "$1/f_1$", which ensures sending the signal shifted by 90° in phase in relation to the codes of ultrasonic signals from the out-port 6.out of the ultrasonic signal source 6 and delayed for "0÷N" sampling rate intervals (depending on the number of the control signal leading edge) to the second in-port 63.2.in of the first multiplier 63.

The first multiplier 63 performs the point-by-point multiplication of the codes sent to its first, 63.1.in, and second, 63.2.in, in-ports. The result of code multiplication is transmitted to the in-port 68.in of the second adder 68. Following the summation of the products of the respective points of incoming signal, the value of correlation function for the selected part of codes of ultrasonic signals digitized at the sampling rate "$f_1$" that have passed in the direction of the flow of the controlled medium 1, and the delayed signal phase shifted by 90° in relation to ultrasonic signal codes received from the output 6.out of the ultrasonic signal source 6 will be calculated.

Controlled by the trailing edge of impulses sent from the third out-port 17.3.out of the control driver 17 (from the out-port 91.out of the first switch 91, from pin 92, to pin 67, and to the second in-port 69.2.in of the first RAM 69), the obtained correlation function value is entered into the first RAM 69. Thus, after "N" control signal impulses have passed from the third out-port 17.3.out of the control driver 17, the first RAM 69 contains mutual correlation function of a part of codes of ultrasonic signals, digitized at the sampling rate of "$f_1$" that have passed in the direction of the flow of the controlled medium 1, with the signal (code) phase shifted by 90° in relation to ultrasonic signals (codes) received from the out-port 6.out of the ultrasonic signal source 6.

The calculated mutual correlation function is equal, within constant factor, to the sine of the delay value for the signal that has passed in the direction of the flow of the CMP 1, in relation to the ultrasonic signal codes of the ultrasonic signal source 6. Therefore, the mutual correlation function will cross the zero level at the moment corresponding to zero delay between the received codes of ultrasonic signals that have passed in the direction of the flow of the CMP 1, and the signal (code) phase shifted by 90° in relation to ultrasonic signals (codes) received from the out-port 6.out of the ultrasonic signal source 6.

In order to specify the delay time of the codes that have passed in the direction of the flow of the CMP 1, the obtained digitized mutual correlation function is applied to the in-port 70.in of the first interpolator 70, which increases the sampling rate of the mutual correlation function up to "$m \cdot f_1$", where "m">>1.

The output signal of the first interpolator 70 from the output 70.out is sent to the in-port 71.in of the first zero-detector 71, which determines the reference address code of the re-digitized mutual correlation function by the reference value closest to zero. The reference address code of the re-digitized mutual correlation function, whose value is closest to zero is sent from the output 71.out of the zero-detector 71 to the in-port 72.in of the first code-to-code converter $72_7$. Generated at the out-port 72.out of the code-to-code converter 72 is a code of the time transmission of the USS that have passed in the direction of the flow of the CMP 1 within one interval of sampling rate "$f_1$" according to the ratio: $\Delta T_1 = A \Delta T_1 / m \cdot f_1$, where $\Delta T_1$ is the code of time of the ultrasonic signal transmission in the direction of the flow of the CMP 1 within one interval of sampling rate "$f_1$"; $A \Delta T_1$ is the code of the position address of the correlation function minimum value written in the RAM 26; m is the number that is much greater than 1; and $f_1$ is the sampling rate.

Thus delivered at the out-port 72.out of the first code-to-code converter 72 (see FIG. 5) will be the value of delay time of the ultrasonic signals that have gone in the direction of the flow of the CMP 1 calculated within one interval of sampling rate "$f_1$" accurate to $1/m \cdot f_1$, where m>>1.

A part of the codes of ultrasonic signals that have passed counter the flow of the CMP 1 digitized at the sampling rate of "$f_1$" is sent from the out-port 61.out of the second switch 61 (see FIG. 5) to the first in-port 73.1.in of the second multiplier 73. Delivered to the first in-port 74.1.in of the second delay line 74 (in fact, to pin 66, which is the fifth in-port 16.5.in of the additional unit 16 for computing the time difference of the ultrasonic signal transmission in and counter the direction of the flow of the CMP 1, and then via the 90° phase changer 65) from the out-port 105.out of the memory unit 105 (from pin 106, see FIG. 8) of the ultrasonic signal source 6 are codes of ultrasonic signals, and sent to the second in-port 74.2.in of the delay line 74 (to pin 67 (see FIG. 5), which is the seventh in-port 16.7.in of the additional unit 16 for computing the time difference of the ultrasonic signal transmission in and counter the direction of the flow of the CMP 1) are the impulses (see FIG. 7, pos. 'g', impulses with the sampling rate of "$f_1$") from the third out-port 17.3.out of the control driver 17 (from pin 92 (see FIG. 6). By each leading edge of the control signals, delay time of the delay line 74 changes by one interval equal to "$1/f_1$", which ensures sending the signal 90°-shifted in relation to the ultrasonic signals and delayed for "0÷N" sampling rate intervals (depending on the control signal leading edge number) to the second in-port 73.2.in of the second multiplier 73 from the out-port 6.out of the ultrasonic signal source 6.

The second multiplier 73 performs the point-by-point multiplication of the codes sent to its first, 73.1.in, and second, 73.2.in, in-ports. The code multiplication result is sent to the in-port 75.in of the third adder 75.

Following the summation of the products of the respective points of incoming signal, the value of correlation function for the selected part of codes of ultrasonic signals, digitized with the sampling rate of "$f_1$" that have passed counter the direction of the flow of the controlled medium 1, and of the delayed signal phase shifted by 90° in relation to ultrasonic signals received from the out-port 6.out of the ultrasonic signal source 6 will be calculated and provided at the output 75.out of the third adder 75.

By the trailing edge of the impulses sent from the third out-port 17.3.out of the control driver 17 (from the out-port 91.out of the first switch 91, from pin 92 (see FIG. 6)), to pin 67 (see FIG. 5) and the second in-port 76.2.in of the second RAM 76) the obtained correlation function value is written into the second RAM 76. Thus, after "N" control signal impulses have passed from the third out-port 17.3.out of the control driver 17, the second RAM 76 contains mutual correlation function of a part of codes of ultrasonic signals digitized at the sampling rate of "$f_1$" that have passed counter the direction of the flow of the controlled medium 1 with the signal phase shifted by 90° in relation to ultrasonic signals received from the out-port 6.out of the ultrasonic signal source 6.

The calculated mutual correlation function is equal, within constant factor, to the sine of the signal delay value relative to the codes of the signals of the ultrasonic signal source 6. Consequently, the mutual correlation function will cross the zero level at the moment corresponding to zero delay between the received codes of ultrasonic signals that have passed counter the direction of the flow of the CMP 1, and the signal phase shifted by 90° in relation to ultrasonic signals received from the out-port 6.out of the ultrasonic signal source 6.

In order to specify the delay codes that have passed counter the direction of the flow of the CMP 1, the obtained digitized mutual correlation function is sent to the in-port 77.in of the second interpolator 77, which increases the sampling rate of the mutual correlation function up to "$m \cdot f_1$", where "m">>1.

The output signal of the second interpolator 77 is sent from its output 77.out to the in-port 78.in of the second zero-detector 78, which determines the reference address code of the re-digitized mutual correlation function by the reference value closest to zero. The reference address code of the re-digitized mutual correlation function, whose value is closest to zero is sent to the in-port 79.in of the second code-to-code converter 79. Generated at the out-port 79.out of the code-to-code converter 79 is the delay time code for the codes of ultrasonic signals that have passed counter the direction of the flow of the CMP 1 within one interval of sampling rate "$f_1$", according to the ratio:

$$\Delta T_2 = A \Delta T_2 / m \cdot f_1, \text{ where}$$

$\Delta T_2$ is the code of the time of ultrasonic signal transmission counter the direction of the flow of the CMP 1 within one interval of sampling rate "$f_1$";

AΔT₂ is the code of position address of the correlation function minimum value written in the RAM 37; m is the number that is much greater than 1; and $f_1$ is the sampling rate.

Thus, at the out-port 79.out of the second code-to-code converter 79 (see FIG. 5) the delay time of the ultrasonic signals that have gone counter the direction of the flow of the CMP 1 within one interval of sampling rate "$f_1$" will be presented calculated accurate to $1/m \cdot f_1$, where m>>1. The code of the delay time $\Delta T_1$ for ultrasonic signals that have passed in the direction of the flow of the CMP within one interval of sampling rate "$f_1$" is sent from the out-port 72.out of the first code-to-code converter 72 to the first in-port 80.1.in of the fourth adder 80.

The code of the delay time $\Delta T_1$ for ultrasonic signals that have passed in the direction of the flow of the CMP within one interval of sampling rate "$f_1$" is sent from the out-port 72.out of the first code-to-code converter 72 to the first in-port 80.1.in of the fourth adder 80. The code of the delay time $\Delta T_2$ for ultrasonic signals that have passed counter the direction of the flow of the CMP within one interval of sampling rate "$f_1$" is sent from the out-port 79.out of the second code-to-code converter 79 to the second (inverted) in-port 80.2.in of the fourth adder 80.

The code of difference $\Delta T_0$ of time intervals between ultrasonic signals that have passed in and counter the direction of the flow of the CMP 1 is sent from the second out-port 15.2.out of the unit 15 for computing the time difference of the ultrasonic signal transmission in and counter the direction of the flow of the CMP 1 (from the out-port 48.out of the peak detector 48, from pin 49, see FIG. 4) to the sixth input 16.6.in of the additional unit 16 for computing the time difference of the ultrasonic signal transmission in and counter the direction of the flow of the CMP 1 (to pin 81 and then to the third in-port 80.3.in of the fourth adder 80, see FIG. 5).

As a result of summing up the codes received by the first, 80.1.in, second (inverted), 80.2.in, and the third, 80.3.in, in-ports of the fourth adder 80, delivered to its out-port 80.out is the code of the accurate difference of time intervals between ultrasonic signals that have passed in and counter the direction of the flow of the CMP 1 according to the formula $$\Delta T = \Delta T_0 + \Delta T_1 - \Delta T_2,$$

where $\Delta T$ is the code of the accurate difference of time intervals between ultrasonic signals that have passed in and counter the direction of the flow of the CMP; $\Delta T_0$ is the code of difference of traveling time between ultrasonic signals that have passed in and counter the direction of the flow of the CMP; $\Delta T_1$ is the code of time of ultrasonic signal transmission in the direction of the flow of the CMP within one interval of sampling rate "$f_1$"; and $\Delta T_2$ is the code of time of ultrasonic signal transmission counter the direction of the flow of the CMP within one interval of sampling rate "$f_1$". If, for example, $\Delta T_0$ is measured within microseconds, $\Delta T_1$ and $\Delta T_2$ are measured, contrary to that, with a substantially higher precision, within nanoseconds, for example. Thus, if $\Delta T_0$ is, for instance, 5 microseconds (5000 nanoseconds), $\Delta T_1$ is 168 nanoseconds, and $\Delta T_2$ is minus 165 nanoseconds, the accurate $\Delta T$ is 5000+168−(−165)=5333, i.e. the precision is 1000 times higher (nanoseconds rather than microseconds are measured).

Sent from the out-port 16.out of the additional unit 16 for computing the time difference of the ultrasonic signal transmission in and counter the direction of the flow of the CMP 1 (from the out-port 80.out of the fourth adder 80 and then from pin 82, see FIG. 5) to the first in-port 18.1.in of the unit 18 for computing the volume flow rate of the CMP 1 is the code of the accurate difference of the time intervals between ultrasonic signals that have passed in and counter the direction of the flow of the CMP 1.

Coming from the out-port 14.out of the unit 14 for computing the time of ultrasonic signal transmission counter the flow of the CMP to the second in-port 18.2.in of the unit 18 for computing the volume flow rate of the CMP 1 is the code of time intervals between the ultrasonic signals sent into the controlled medium and the ultrasonic signals that have passed counter the direction of the flow of the CMP 1.

Coming from the second out-port 13.2.out of the unit 13 for computing the time of ultrasonic signal transmission in the direction of the flow of the CMP 1 to the third in-port 18.3.in of the unit 18 for computing the volume flow rate of the CMP 1 is the code of time intervals between the ultrasonic signals sent into the controlled medium and the ultrasonic signals that have passed in the direction of the flow of the CMP 1.

According to the codes sent to the first, 18.1.in, second, 18.2.in, and third, 18.3.in, in-ports of the unit 18 for computing the volume flow rate of the CMP 1, it computes the volume flow rate (Q) of the CMP 1 using the formula:

$$Q = \frac{\Delta T}{(T_1 - \tau)(T_2 - \tau)} \cdot k,$$

where:

$\Delta T$—the code of accurate difference of time of ultrasonic signal transmission in and counter the direction of the flow of the CMP; $T_1$—the code of time of ultrasonic signal transmission in the direction of the flow of the CMP; $T_2$—the code of time of ultrasonic signal transmission counter the direction of the flow of the CMP; $\tau$—the constant value that depends on the dimension geometry and materials of the transmitting-receiving radiators of ultrasonic signals; and $\kappa$—a proportionality factor depending on the geometric dimensions inside the pipeline 1.

From the out-port 18.out of the unit 18 for computing the volume flow rate of the CMP 1, the measurement result is sent to the in-port 19.in of the unit 19 for indicating the volume flow rate of the CMP 1, to be presented, e.g., on a display.

Thus, by using the correlation measuring method, increasing the sampling rate by using interpolators, and adding the additional unit for computing the time difference of the ultrasonic signal transmission in and counter the direction of the flow of the CMP, the proposed device for measuring the volume flow rate of the CMP allows obtaining more accurate computation of the delay time difference of the digital codes of ultrasonic signals that have passed in and counter the direction of the flow of the CMP, to eventually achieve a higher accuracy when determining the volume flow rate of the CMP.

Therefore, the proposed technical solution is believed to take its well-deserved position among known methods used for similar purposes.

What is claimed is:

1. A method of determining a volume flow rate of a controlled media in a pipeline (CMP), comprising the steps of:
   (a) forming a sequence of primary ultrasound signals (USS);
   (b) alternately transmitting the USS in and counter the direction of a flow of the CMP;
   (c) alternately receiving the USS that passed in and counter the direction of the flow of the CMP;
   (d) forming a mutual correlation function of the codes of the USS passed in the direction of the flow of the CMP and the codes of the primary USS, to thereby determine the time of USS transmission in the direction of the flow of the CMP;

(e) forming a mutual correlation function of the codes of the USS passed counter the direction of the flow of the CMP and the codes of the primary USS, to thereby determine the time of USS transmission counter the direction of the flow of the CMP;

(f) forming a mutual correlation function of the codes of the USS passed in and counter the direction of the flow of the CMP, to thereby determine the difference between the time of USS transmission in and counter the direction of the flow of the CMP;

(g) forming a code of the position address for the maximum value of the mutual correlation function of the codes of the USS passed in and counter the direction of the flow of the CMP, to thereby form a code of the time difference of the USS transmission in and counter the direction of the flow of the CMP;

(h) forming an array of address codes corresponding to moments of zero crossing of the codes of the USS passed in the direction of the flow of the CMP;

(i) determining the code of zero crossing moment address for the codes of the USS passed in the direction of the flow of the CMP, which the closest to the code of the position address for the maximum value of the mutual correlation function;

(j) selecting a part of codes of the USS passed in the direction of the flow of the CMP, which corresponds to the maximum value of the correlation function;

(k) forming a mutual correlation function of the selected part of the codes of the USS passed in the direction of the flow of the CMP and a delayed code phase shifted by 90° in relation to codes of the primary USS;

(l) re-digitizing this mutual correlation function at $mf_1$, where "m">>1, and forming a code of the time transmission of the USS passed in the direction of the flow of the CMP within one interval of the sampling rate "$f_1$" according to the ratio $\Delta T_1 = A\Delta T_1/m \cdot f_1$, where $\Delta T_1$ is the code of time of the ultrasonic signal transmission in the direction of the flow of the CMP within an interval of sampling rate "$f_1$"; $A\Delta T_1$ is a code of the position address of the correlation function minimum value, m>>1, $f_1$—sampling rate;

(m) selecting a part of codes of the USS passed counter the direction of the flow of the CMP, which corresponds to the maximum value of the correlation function;

(n) forming a mutual correlation function of the selected part of the codes of the USS passed counter the direction of the flow of the CMP and a delayed code phase shifted by 90° in relation to codes of the primary USS;

(o) re-digitizing this mutual correlation function at in $f_1$, where "m">>1, and forming a code of the time transmission of the USS passed in the direction of the flow of the CMP within one interval of the sampling rate "$f_1$" according to the ratio $\Delta T_2 = A\Delta T_2/m \cdot f_1$, where $\Delta T_2$ is the code of time of the ultrasonic signal transmission counter the direction of the flow of the CMP within an interval of sampling rate "$f_1$"; $A\Delta T_2$ is a code of the position address of the correlation function minimum value, m>>1, $f_1$—sampling rate;

(p) determining a code of the accurate difference of time intervals between the USS passed in and counter the direction of the flow of the CMP according to the formula $\Delta T = \Delta T_0 + \Delta T_1 - \Delta T_2$, where $\Delta T$ is the code of the accurate difference of time intervals between the USS passed in and counter the direction of the flow of the CMP; $\Delta T_0$ is the code of difference of traveling time between the USS passed in and counter the direction of the flow of the CMP; $\Delta T_1$ is the code of time of USS transmission in the direction of the flow of the CMP within one interval of sampling rate "$f_1$"; and $\Delta T_2$ is the code of time of USS counter the direction of the flow of the CMP within one interval of sampling rate "$f_1$"; and (q) determining the volume flow rate of the CMP from the formula $$Q = \frac{\Delta T}{(T_1 - \tau)(T_2 - \tau)} \cdot k,$$

where:
$\Delta T$—the code of accurate difference of time of USS transmission in and counter the direction of the flow of the CMP; $T_1$—the code of time of USS transmission in the direction of the flow of the CMP; $T_2$—the code of time of USS transmission counter the direction of the flow of the CMP; $\tau$—the constant value that depends on the dimension geometry and materials of the transmitting-receiving radiators of USS; and κ—a proportionality factor depending on the geometric dimensions inside the pipeline.

2. The method as claimed in claim 1, wherein the primary USS are formed in a digital form and are transformed in analog signals prior to transmitting the same into the pipeline, and the signals received from the pipeline are digitized back at the sampling rate $f_1$.

3. The method as claimed in claim 1 wherein m>=1000.

* * * * *

UNITED STATES PATENT AND TRADEMARK OFFICE
CERTIFICATE OF CORRECTION

PATENT NO. : 8,695,435 B2 Page 1 of 1
APPLICATION NO. : 13/212614
DATED : April 15, 2014
INVENTOR(S) : Yuriy I. Romanov et al.

It is certified that error appears in the above-identified patent and that said Letters Patent is hereby corrected as shown below:

In the Claims

At column 24, claim number 1, line number 3, "at in $f_1$," should be changed to --at $mf_1$,--.

Signed and Sealed this
Twelfth Day of August, 2014

Michelle K. Lee
*Deputy Director of the United States Patent and Trademark Office*